(12) United States Patent
Seligmann et al.

(10) Patent No.: US 10,203,839 B2
(45) Date of Patent: *Feb. 12, 2019

(54) THREE-DIMENSIONAL GENERALIZED SPACE

(71) Applicant: Avaya Inc., Santa Clara, CA (US)

(72) Inventors: Doree Duncan Seligmann, New York, NY (US); Ajita John, Holmdel, NJ (US); Michael J. Sammon, Watchung, NJ (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 15/296,921

(22) Filed: Oct. 18, 2016

(65) Prior Publication Data

US 2017/0038943 A1    Feb. 9, 2017

Related U.S. Application Data

(63) Continuation-in-part of application No. 15/009,950, filed on Jan. 29, 2016, now Pat. No. 9,838,818, which
(Continued)

(51) Int. Cl.
  *G06F 3/0481* (2013.01)
  *H04S 7/00* (2006.01)
(Continued)

(52) U.S. Cl.
  CPC .......... *G06F 3/04815* (2013.01); *G06F 3/167* (2013.01); *G06F 17/3074* (2013.01);
(Continued)

(58) Field of Classification Search
  CPC .......... G06F 3/04815; G06F 17/30017; G10L 21/10; H04S 3/002; H04S 7/303; H04R 27/00; H04W 4/021
(Continued)

(56) References Cited

U.S. PATENT DOCUMENTS 5,736,982 A    4/1998  Suzuki et al.
5,768,393 A    6/1998  Mukojima et al.
(Continued)

FOREIGN PATENT DOCUMENTS

JP    H07-44575    2/1995

OTHER PUBLICATIONS

Official Action for U.S. Appl. No. 15/009,950, dated May 3, 2017, 9 pages.
(Continued)

*Primary Examiner* — Gerald Gauthier
(74) *Attorney, Agent, or Firm* — Sheridan Ross P.C.

(57) ABSTRACT

According to one embodiment, audio and non-audio data can be represented as sound sources in a three-dimensional sound space adapted to also provide visual data. Non-audio data can be associated with audio sound sources presented in the sound space. Navigation within this combined three-dimensional audio/visual space can be based primarily on the audio aspects of the sound sources with the details of the non-audio data being presented on demand, for example, when the listener navigates through the combined three-dimensional audio/visual space to a particular sound source at which point the non-audio data associated with that sound source can be presented.

20 Claims, 9 Drawing Sheets

Related U.S. Application Data is a continuation of application No. 13/728,467, filed on Dec. 27, 2012, now Pat. No. 9,301,069.

(51) Int. Cl.
| | |
|---|---|
| *G06F 3/16* | (2006.01) |
| *G06F 17/30* | (2006.01) |
| *H04R 27/00* | (2006.01) |
| *H04S 3/00* | (2006.01) |

(52) U.S. Cl.
CPC ....... *G06F 17/30752* (2013.01); *H04R 27/00* (2013.01); *H04S 3/002* (2013.01); *H04S 7/302* (2013.01); *H04S 7/40* (2013.01); *H04R 2227/003* (2013.01); *H04R 2227/005* (2013.01); *H04S 2400/11* (2013.01)

(58) Field of Classification Search
USPC ............... 348/485, 47; 381/92, 310; 700/94; 704/9; 707/756; 709/203, 223; 715/850, 715/808; 725/12; 340/905; 345/419, 345/473; 706/46
See application file for complete search history.

(56) References Cited

U.S. PATENT DOCUMENTS

| | | | |
|---|---|---|---|
| 5,828,626 A | 10/1998 | Castile et al. | |
| 5,943,427 A | 8/1999 | Massie et al. | |
| 5,997,439 A | 12/1999 | Ohsuga et al. | |
| 6,243,476 B1 | 6/2001 | Gardner | |
| 6,404,442 B1 | 6/2002 | Hilpert, Jr. et al. | |
| 6,442,277 B1 | 8/2002 | Lueck et al. | |
| 6,469,712 B1 | 10/2002 | Hilpert, Jr. et al. | |
| 6,504,933 B1 | 1/2003 | Chung | |
| 6,647,119 B1 | 11/2003 | Slezak | |
| 6,694,033 B1 | 2/2004 | Rimell et al. | |
| 6,845,338 B1 | 1/2005 | Willins et al. | |
| 7,308,325 B2 | 12/2007 | Coles et al. | |
| 7,469,283 B2 * | 12/2008 | Eyal .................. | G06F 17/30038 |
| | | | 707/E17.009 |
| 7,495,998 B1 | 2/2009 | Deligeorges et al. | |
| 7,590,249 B2 | 9/2009 | Jang et al. | |
| 8,190,438 B1 | 5/2012 | Nelissen | |
| 8,639,214 B1 | 1/2014 | Fujisaki | |
| 9,301,069 B2 | 3/2016 | Seligmann et al. | |
| 9,736,613 B2 | 8/2017 | Osman | |
| 9,892,743 B2 * | 2/2018 | Seligmann .............. G10L 21/10 |
| 2001/0055398 A1 | 12/2001 | Pachet et al. | |
| 2002/0143413 A1 | 10/2002 | Fay et al. | |
| 2002/0161462 A1 | 10/2002 | Fay et al. | |
| 2002/0174121 A1 | 11/2002 | Clemie | |
| 2002/0175996 A1 | 11/2002 | Porter et al. | |
| 2003/0063133 A1 | 4/2003 | Foote et al. | |
| 2004/0111171 A1 * | 6/2004 | Jang ........................... | H04S 7/30 |
| | | | 700/94 |
| 2004/0174431 A1 | 9/2004 | Stienstra | |
| 2004/0240652 A1 | 12/2004 | Kanada | |
| 2005/0222844 A1 | 10/2005 | Kawahara et al. | |
| 2005/0265535 A1 | 12/2005 | Kanada | |
| 2006/0007308 A1 | 1/2006 | Ide et al. | |
| 2006/0008100 A1 | 1/2006 | Kim et al. | |
| 2006/0008117 A1 | 1/2006 | Kanada | |
| 2006/0045275 A1 | 3/2006 | Daniel | |
| 2006/0095453 A1 | 5/2006 | Miller et al. | |
| 2006/0200769 A1 | 9/2006 | Chevallier et al. | |
| 2006/0251263 A1 | 11/2006 | Vronay | |
| 2007/0083365 A1 | 4/2007 | Shmunk | |
| 2007/0168413 A1 * | 7/2007 | Barletta .............. | G06F 3/04883 |
| | | | 709/203 |
| 2008/0012850 A1 | 1/2008 | Keating, III | |
| 2008/0123867 A1 | 5/2008 | Yano et al. | |
| 2008/0133190 A1 | 6/2008 | Peretz et al. | |
| 2008/0215239 A1 | 9/2008 | Lee | |
| 2009/0046864 A1 | 2/2009 | Mahabub et al. | |
| 2009/0063414 A1 * | 3/2009 | White .............. | G06F 17/30017 |
| 2009/0164122 A1 | 6/2009 | Morbey et al. | |
| 2009/0192785 A1 * | 7/2009 | Cavender ................ | G06T 19/00 |
| | | | 704/9 |
| 2009/0225164 A1 | 9/2009 | Renkis | |
| 2009/0251459 A1 | 10/2009 | Navarro | |
| 2009/0286600 A1 | 11/2009 | Hideya | |
| 2009/0305787 A1 | 12/2009 | Ikejiri et al. | |
| 2010/0097375 A1 | 4/2010 | Tadaishi et al. | |
| 2011/0066365 A1 | 3/2011 | Khawand | |
| 2011/0078173 A1 | 3/2011 | Seligmann et al. | |
| 2011/0096915 A1 | 4/2011 | Nemer | |
| 2011/0106825 A1 * | 5/2011 | Xiang ............... | G06F 17/30775 |
| | | | 707/756 |
| 2011/0109798 A1 * | 5/2011 | McReynolds ............ | H04S 7/30 |
| | | | 348/485 |
| 2011/0138991 A1 | 6/2011 | Tsuchida | |
| 2011/0218953 A1 * | 9/2011 | Hale ....................... | G06Q 10/00 |
| | | | 706/46 |
| 2012/0022842 A1 | 1/2012 | Amadu | |
| 2012/0051568 A1 | 3/2012 | Kim et al. | |
| 2012/0070005 A1 | 3/2012 | Inou et al. | |
| 2012/0076305 A1 | 3/2012 | Virolainen | |
| 2012/0109375 A1 | 5/2012 | Hallam et al. | |
| 2012/0183161 A1 | 7/2012 | Agevik et al. | |
| 2012/0200711 A1 | 8/2012 | Dolin | |
| 2012/0213375 A1 | 8/2012 | Mahabub et al. | |
| 2012/0269351 A1 | 10/2012 | Sato | |
| 2012/0294456 A1 | 11/2012 | Jiang et al. | |
| 2012/0308056 A1 | 12/2012 | Nakayama | |
| 2013/0007604 A1 | 1/2013 | John et al. | |
| 2013/0028424 A1 | 1/2013 | Kim et al. | |
| 2013/0035935 A1 | 2/2013 | Kim et al. | |
| 2013/0041648 A1 | 2/2013 | Osman | |
| 2013/0064376 A1 | 3/2013 | Kaburlasos et al. | |
| 2013/0083941 A1 | 4/2013 | Rogel et al. | |
| 2013/0141587 A1 | 6/2013 | Petricoin, Jr. | |
| 2013/0162752 A1 | 6/2013 | Herz et al. | |
| 2013/0162821 A1 | 6/2013 | Park et al. | |
| 2013/0208897 A1 | 8/2013 | Pile et al. | |
| 2013/0298146 A1 * | 11/2013 | Conrad ................ | H04N 21/252 |
| | | | 725/12 |
| 2013/0307843 A1 * | 11/2013 | Sikka ....................... | G06T 15/00 |
| | | | 345/419 |
| 2014/0010391 A1 * | 1/2014 | Ek ........................... | G06F 3/011 |
| | | | 381/310 |
| 2014/0092099 A1 * | 4/2014 | Ashbrook ................ | G06F 1/1647 |
| | | | 345/473 |
| 2014/0096076 A1 * | 4/2014 | Ashbrook ............... | G06F 3/013 |
| | | | 715/808 |
| 2014/0153751 A1 | 6/2014 | Wells | |
| 2014/0157206 A1 | 6/2014 | Ovsiannikov et al. | |
| 2014/0167986 A1 * | 6/2014 | Parada ................. | G01C 21/365 |
| | | | 340/905 |
| 2014/0171195 A1 | 6/2014 | Searchfield et al. | |
| 2014/0376728 A1 | 12/2014 | Ramo et al. | |
| 2016/0150340 A1 | 5/2016 | Seligmann et al. | |
| 2017/0040028 A1 | 2/2017 | Seligmann et al. | |
| 2017/0041730 A1 | 2/2017 | Seligmann et al. | |
| 2018/0176727 A1 * | 6/2018 | Williams ................ | H04L 63/20 |

OTHER PUBLICATIONS

Official Action for U.S. Appl. No. 13/728,467, dated Jun. 5, 2015, 8 pages.
Notice of Allowance for U.S. Appl. No. 13/728,467, dated Nov. 16, 2015, 8 pages.
Notice of Allowance for U.S. Appl. No. 15/009,950, dated Aug. 24, 2017, 10 pages.
Official Action for U.S. Appl. No. 15/296,238, dated Jun. 16, 2017, 16 pages.
Notice of Allowance for U.S. Appl. No. 15/296,238, dated Oct. 3, 2017, 9 pages.

(56) References Cited

OTHER PUBLICATIONS

Notice of Allowance for U.S. Appl. No. 15/296,883, dated Jul. 14, 2017, 12 pages.

* cited by examiner

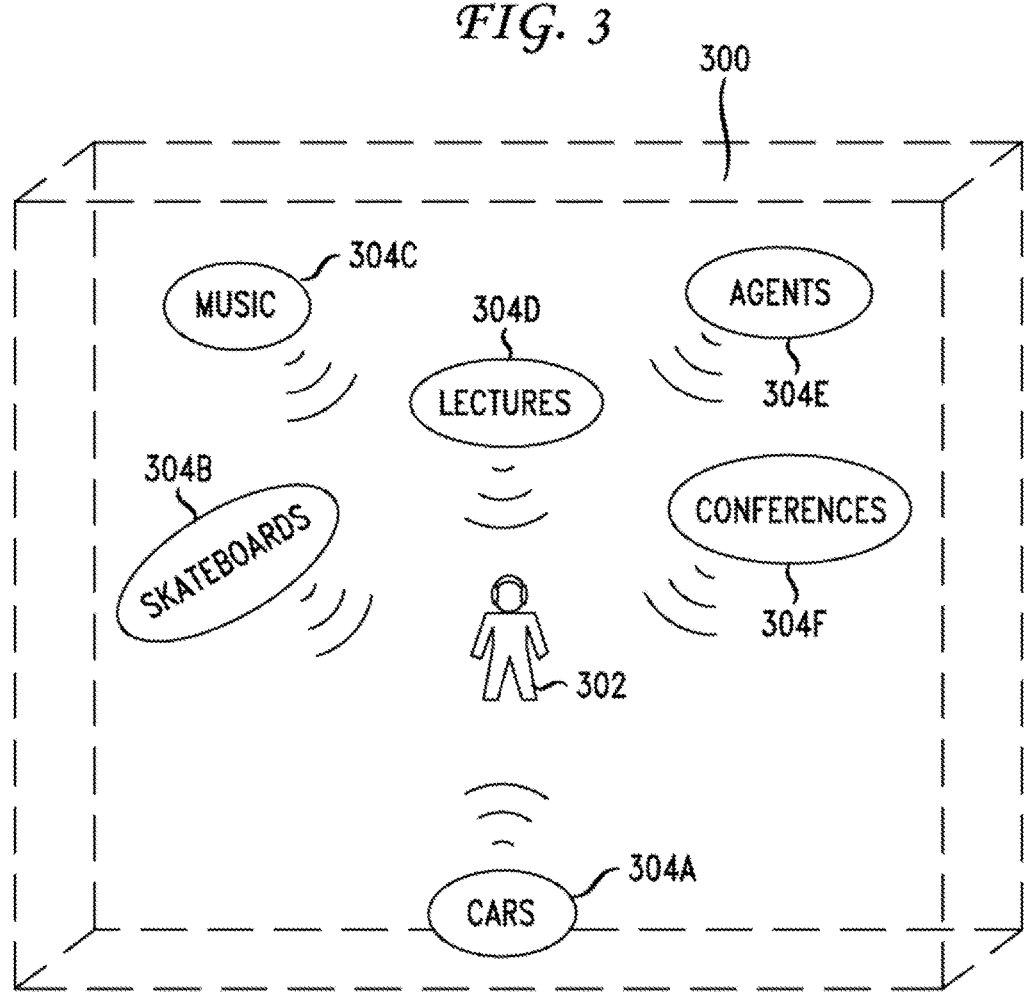

THREE-DIMENSIONAL GENERALIZED SPACE

CROSS REFERENCE TO RELATED APPLICATION

The present application is a continuation-in-part of U.S. application Ser. No. 15/009,950 filed Jan. 29, 2016 by Seligmann et. al. and entitled "Immersive 3D Sound Space for Searching Audio" which is a continuation of U.S. application Ser. No. 13/728,467 filed Dec. 27, 2012 by Seligmann et. al. and entitled "Immersive 3D Sound Space for Searching Audio" of which the entire disclosure of each is incorporated herein by reference for all purposes.

FIELD OF THE DISCLOSURE

Embodiments of the present disclosure relate generally to methods and systems for three-dimensional sound spaces and more particularly to generating an immersive three-dimensional sound space for audio searching.

BACKGROUND

A typical computer-supported search returns a list of hits, ranked and ordered, based on the particular search query. In addition, the search result often includes other information, such as links and descriptive summaries. This type of search is generally appropriate for textual content. For example, a search of textual content can be performed through an Internet search engine to obtain a list of text hits ranked according to specific criteria specified by the user and the search engine. Similarly, an online library service search may be performed to obtain a list of articles or books, which may be ranked and ordered according to their similarity to the text in the search query.

Similar searching techniques can also be applied to search video and image content. For example, a search of videos or images can be performed to obtain a list of videos or images matching the search criteria. The videos in a video search can be rendered with an image of a single frame or a short segment for each video. The user can identify the desired video based on the image rendered for that video. Moreover, the images in an image search can be rendered as a grid of thumbnails. Here, the user can identify the desired image based on the thumbnail associated with that image.

Audio files can also be searched in a similar way. For example, audio files can be searched based on a text query to help a user identify relevant audio files. The text query can match with content of the audio file, or some metadata associated with the audio file, such as a participant's name, a subject, a date, or a tag. Here, the search can produce a list or table of audio files ranked and ordered by relevance. The user can then identify the audio files based on the text description. The user can also listen to the audio in an audio file from the search results to help identify the audio file. To listen to the audio in an audio file, the user must click or select the audio file to activate it and initiate audio playback. However, this process can be terribly inefficient, as users have to play each audio file separately to listen to the audio in the file. Yet users may often have to listen to an audio file to be able to correctly identify the audio file. Thus, searching the audio files based on a textual query often does not allow the user to sufficiently identify the desired audio file. However, as the number of audio files to search increases, the process of playing and listening to each audio file separately can become significantly onerous.

BRIEF SUMMARY

Embodiments of the disclosure provide systems and methods for generating a three-dimensional sound space having a plurality of sound sources playing at a same time, wherein each of the plurality of sound sources is assigned a respective location in the three-dimensional sound space relative to one another, and wherein a user is assigned a current location in the three-dimensional sound space relative to each respective location. In some embodiments, the system can first receive a search request from the user to search for sound sources and identify the sound sources based on the search criteria in the search request. The system can then generate the three-dimensional sound space based on the sound sources.

The plurality of sound sources can include an audio file, a live communication session, a recorded conversation, etc. The three-dimensional sound space can be based on a three-dimensional particle system, for example. Moreover, the three-dimensional sound space can be generated using three-dimensional audio spatialization to allow audio from multiple sound sources playing at a same time to be separated in space through sound localization. Here, the three-dimensional audio spatialization can create the famous cocktail party effect from the multiple sound sources, allowing the user to listen to multiple sound sources at once and, at the same time, recognize each sound source.

Moreover, each respective location can be assigned to a respective sound source from the plurality of sound sources based on a relationship between the plurality of sound sources. For example, the sound sources can be assigned locations based on their differences, their similarities, their relative relevance to the user, their ranking, their age, their associated date, their topic(s), and/or other factors. The plurality of sound sources can also be arranged based on groupings. The groupings can be based on a topic, a relevance, a search request, an association, a term, a ranking, a context, content, etc. The plurality of sound sources can dynamically self-arrange into groups as the user navigates and/or searches the three-dimensional sound space.

Next, the system receives input from the user to navigate to a new location in the three-dimensional sound space. The new location can be a virtual location within the three-dimensional sound space or a new three-dimensional sound space. The system can receive the input via a mouse, a touch screen, a touchpad, a keyboard, a camera, a photo-capture device, a voice-input device, a motion capture device, a system state, a device state, a sensor, a joystick, a software control, a control pad, an external event, etc. Moreover, the input can be text, audio, a gesture, a movement, a selection, a click, a motion, a command, an instruction, an event, a signal from an input device, etc. For example, the user can use a control device, such as a joystick, to navigate to the new location in the three-dimensional sound space. As another example, the user can navigate to the new location by physically moving in the direction of the new location as perceived by the user in the three-dimensional sound space.

Based on the input, the system then changes each respective location of the plurality of sound sources relative to the new location in the three-dimensional sound space. The system can dynamically arrange the plurality of sound sources based on the new location to simulate the user's movement through the three-dimensional sound space. For the user, such dynamic arrangement can create the perception that the user has navigated the three-dimensional sound space. As the user navigates the three-dimensional sound space, the plurality of sound sources can be dynamically arranged based on groupings, categories, rankings, context, ratings, relevance, similarities, etc. For example, the plurality of sound sources can be dynamically arranged according to groupings based on a topic, a relevance, a search request, an association, a term, content, and so forth.

In some embodiments, the system can receive a user selection of a sound source from the three-dimensional sound space and generate a new three-dimensional sound space based on sound sources related to the selected sound source. Here, the sound sources can be assigned locations relative to one another, and the user can be assigned a location relative to the sound sources and associated with the sound source. For example, the user can select a sound source from the three-dimensional sound space, and the system can then generate a new three-dimensional sound space having sound sources that are relevant to the sound source selected by the user. The sound sources in the new three-dimensional sound space can be arranged or grouped based on one or more factors, such as similarities, differences, age, topics, rankings, ratings, etc. The user can select the sound source from the three-dimensional sound space by moving toward the sound source in the three-dimensional sound space, clicking on a graphical representation of the sound source in an interface, navigating towards the sound source using a navigation device or button, gesturing to select the sound source, etc.

In other embodiments, the system can receive a user selection of a sound source from the three-dimensional sound space and update the three-dimensional sound space based on the sound sources related to the selected sound source. In yet other embodiments, the system can use a three-dimensional particle system to dynamically lay out and order the plurality of sound sources in the three-dimensional sound space. The respective locations of the plurality of sound sources can be based on their relationships to the various search objects the user has selected. Thus, the three-dimensional sound space can act like a faceted search system. However, in some aspects, the objects in the three-dimensional sound space are not removed from the three-dimensional sound space as search terms are introduced. Instead, the objects can move towards the terms that they are associated with, and those objects with no associations can fall to the ground. This self-arrangement can represent relationships between the content objects and the search objects and allow the user to listen to similarities (if there are any) of the objects that are grouped together.

Embodiments of the disclosure can be used with a wide variety of different content and in a variety of different applications. That is, the three-dimensional sound space as described herein can be generated based on sound sources of different origins and types and for a number of different uses. Additionally or alternatively, the sound sources may be or relate to content other than audio content. For example, a sound source may comprise documents, emails, social media posts, text messages, instant messages, or any of a wide variety of textual information converted by a text-to-speech engine to an audio format. In such cases, the three-dimensional sound space can be generated and the sound sources therein including the converted textual content source can be grouped as described. Additionally or alternatively, the generation of the three-dimensional sound space and/or groupings of the sound sources therein can be based on attributes of the sources such as defined by one or more metadata tags associated with the sound sources. Such attributes can be the basis of identifying similarities, differences, relationships, etc. between sound sources and can therefore be the basis of grouping those sound sources together and arranging or locating them in the sound space. In some cases, these attributes may be converted to audio and added to the sound space in addition to or instead of the actual content of the source to either augment or simplify the sound space and assist the user in navigating through the space.

According to one embodiment, the three-dimensional sound space can comprise a combined three-dimensional audio/visual space. That is, both audio and non-audio data can be represented as sound sources in a three-dimensional sound space adapted to also provide visual data. The non-audio data can comprise video, images, text, documents, and/or any other data typically presented in a visual form. Such non-audio data can be associate with audio sound sources presented in the sound space. In some cases, the non-audio data can be associated with a sound source representing audio data to which the non-audio data relates, e.g., the sound track of a video and the visual portion of the video can be associated and represented in the combined three-dimensional audio/visual space. In other cases, a sound source associated with the non-audio data can be generated from the non-audio data, e.g., by converting the text of a document to speech or by converting attributes of the non-audio data to one or more sound sources associated with the non-audio data.

Navigation within this combined three-dimensional audio/visual space can be based primarily on the audio aspects of the sound sources with the details of the non-audio data being presented on demand, for example, when the listener navigates through the combined three-dimensional audio/visual space to a particular sound source at which point the non-audio data associated with that sound source can be presented, e.g., on a monitor or wearable display that can be combined with or separate from audio equipment used to present the sound sources. This combined three-dimensional audio/visual space can provide a convenient and efficient way to review large volumes of data that include a mix of audio and visual elements such as may be found on social media networks or any of a variety of Internet or other network sites. According to one embodiment, the combined three-dimensional audio/visual space can be used to provide a video conferencing environment. Additionally or alternatively, the combined three-dimensional audio/visual space can be used to provide a virtual classroom or other collaboration environment.

BRIEF DESCRIPTION OF THE DRAWINGS

FIG. 3 illustrates an example three-dimensional sound space for searching audio.

Figure 1:
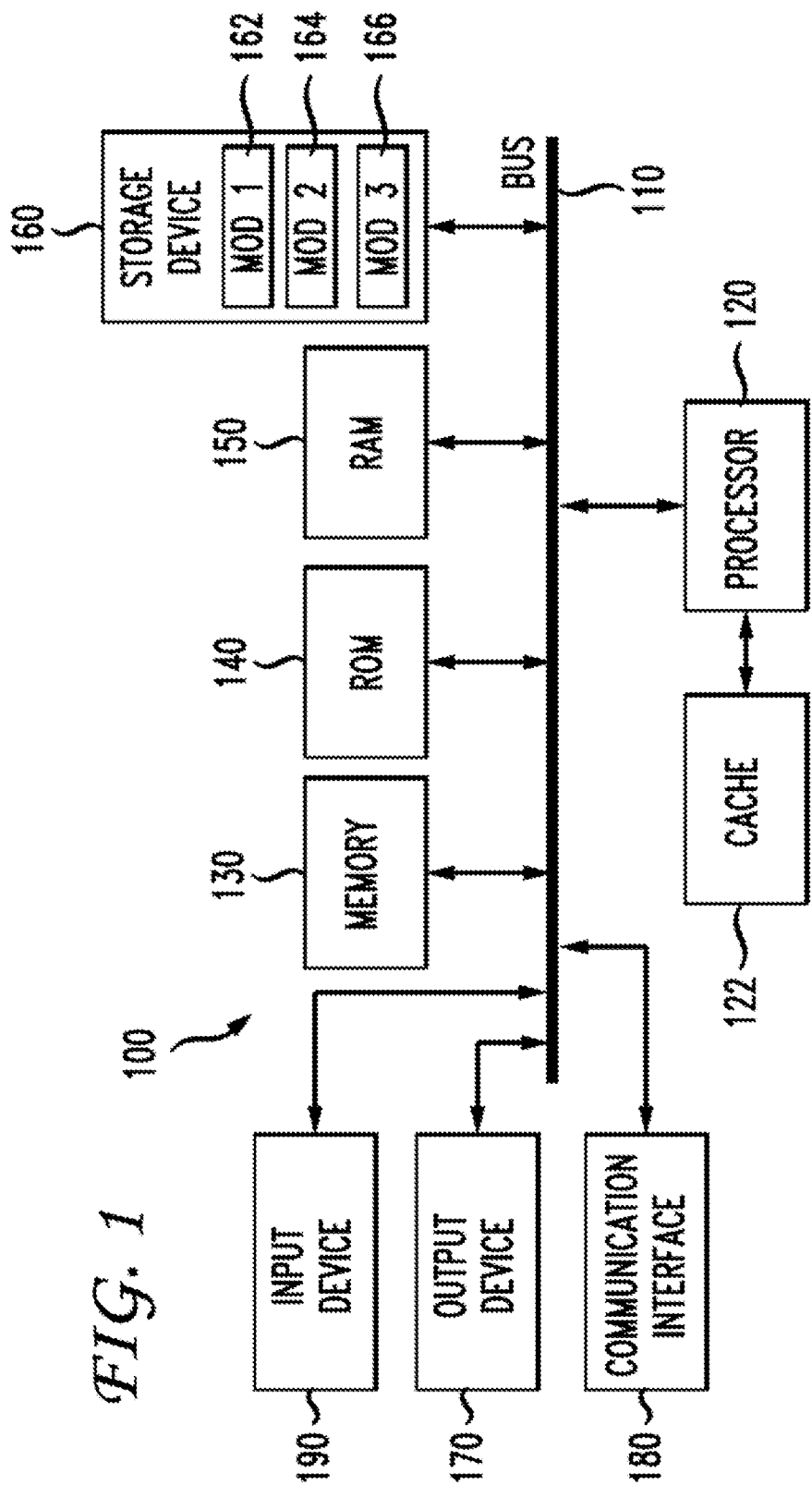
FIG. 1 illustrates an example system embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosured herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

With reference to FIG. 1, an example system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the example embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the example operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
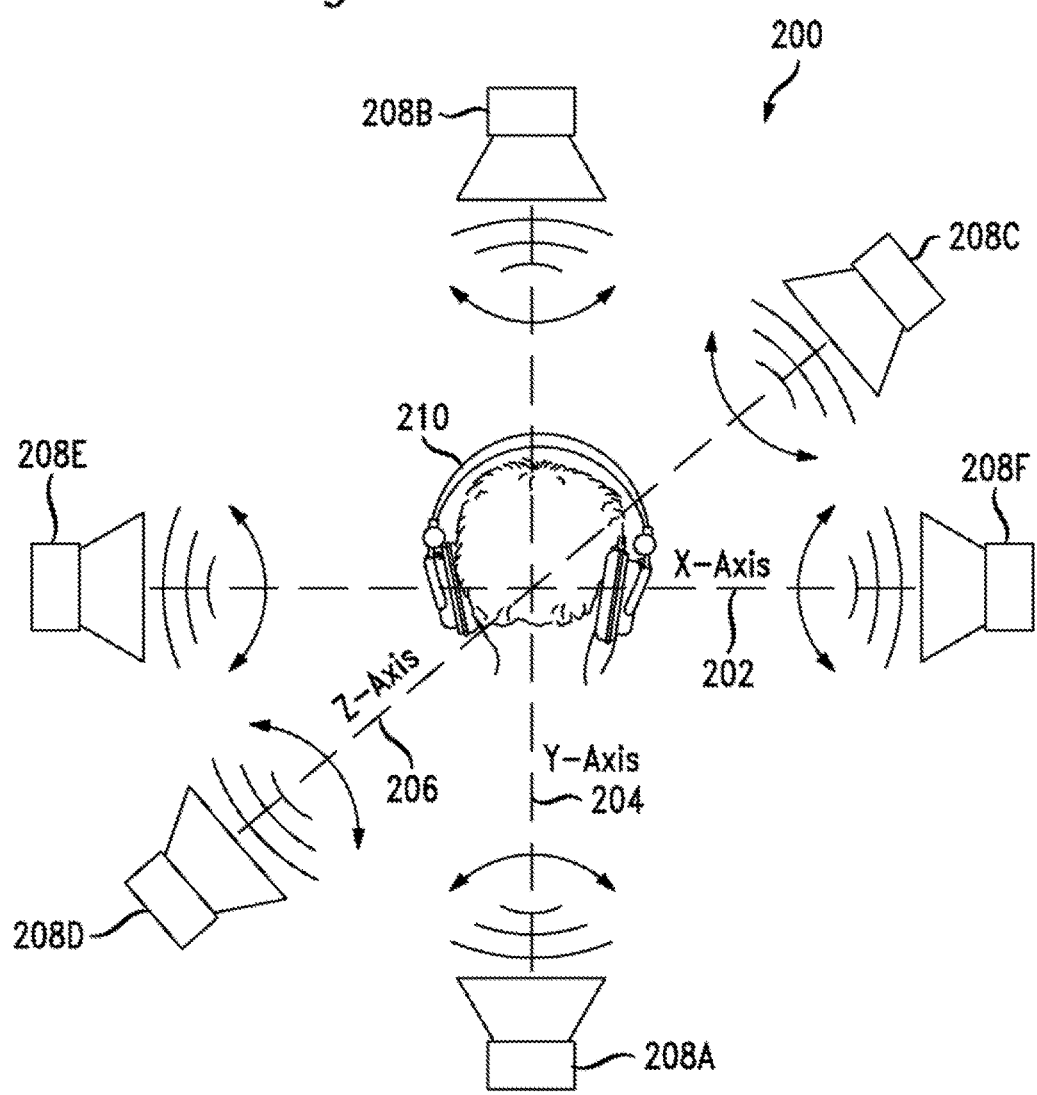
FIG. 2 illustrates an example three-dimensional reference coordinate system for a three-dimensional sound space.

Having disclosed some components of a computing system, the disclosure now turns to FIG. 2, which illustrates an example three-dimensional reference coordinate system 200 for a three-dimensional sound space. The three-dimensional reference coordinate system 200 includes an X-axis 202, a Y-axis 204, and a Z-axis 206. Each axis represents a dimension of sound. In particular, the X-axis 202 represents the width, the Y-axis 204 represents the height, and the Z-axis 206 represents the depth. The three-dimensional reference coordinate system 200 can include sound sources 208A-F that provide sound at each of the three dimensions 202, 204, and 206. For example, sound sources 208A and 208B can provide sound along the vertical plane, Y-axis 204. By contrast, sound sources 208E and 208F can provide sound along the horizontal plane, X-axis 202. In some embodiment, the same sound source can provide sound along multiple dimensions. Indeed, the same sound source can provide sound along all three dimensions 202, 204, and 206. Moreover, each dimension can be mapped to an axis. Dimensions can be mapped to axes based on the sound sources 208A-F, metadata, external information about the sound sources 208A-F, etc.

In FIG. 2, the user 210 can perceive the sound from sound source 208A to originate from an area below the user 210. The user 210 can also perceive the sound from sound source 208B to originate from an area above the user 210. Moreover, the user 210 can perceive the sound from sound sources 208E and 208F to originate from an area to the left and right, respectively, of the user 210. Finally, the user 210 can perceive the sound from sound sources 208C and 208D to originate from an area in front and behind, respectively, of the user 210. This way, the user 210 can experience sound from all three dimensions within the three-dimensional reference coordinate system 200. The user 210 can experience the sound from the various dimensions using any output device, such as a mobile device, an augmented reality device, a gaming system, a smart television, computerized glasses, a tablet computer, a smartphone, etc FIG. 3 illustrates an example three-dimensional sound space 300 for searching audio. The three-dimensional sound space 300 is a virtual sound space that provides the user 302 with sound from three dimensions. However, in some embodiments, the virtual sound space can include less or more than three dimensions. For example, the virtual sound space can be a four-dimensional sound space. The virtual sound space can depict a four-dimensional view of various sound sources. The user 302 can browse, search, navigate the three-dimensional sound space 300 using any output device, such as a mobile device, an augmented reality device, a gaming system, a smart television, computerized glasses, a tablet computer, a smartphone, etc. The three-dimensional sound space 300 can include sound sources 304A-F located at specific locations relative to one another, within the three-dimensional sound space 300. The sound sources 304A-F can include audio recordings, audio files, and/or live inputs, for example. Moreover, the sound sources 304A-F can be stationary, or can also move within the three-dimensional sound space 300. Also, the dimensions in the three-dimensional sound space 300 can be mapped to axes based on external information about the sound sources 304A-F, for example. An apparent location of the user 302 in the three-dimensional sound space 300 can be used to determine the distance of the user 302 from the sound sources 304A-F.

The three-dimensional sound space 300 can use audio spatialization to allow the user 302 to listen to all of the sound sources 304A-F at the same time, in a manner that the sound sources 304A-F are distinguishable to the user 302, based on the respective locations of the sound sources 304A-F. This way, the three-dimensional sound space 300 can play all sound sources 304A-F at the same time and the user 302 can recognize each of the sound sources 304A-F. This can create what is known as the cocktail effect, where the user 302 can hear the closer sound sources more clearly, but can still faintly recognize the sound sources that are farthest away from the user 302. The audio spatialization can be generated using a particle system to map the spatial trajectories of sound.

The three-dimensional sound space 300 can also provide stereophonic ("stereo") sound. For example, the three-dimensional sound space 300 can use two or more independent audio channels to create an illusion of directionality and sound perspective. Moreover, the three-dimensional sound space 300 can be enhanced with synthesized sound effects, comments, tags, metadata, visual effects, etc. For example, the three-dimensional sound space 300 can be enhanced with an applause to depict live events, or comments, such as "I love this song," to provide additional information about a sound source.

The three-dimensional sound space 300 can also include a visual component for displaying content, such as images, video, text, media, sound sources, dimensions, etc. For example, the sound sources 304A-F can provide additional visual cues, such as the pictures of speakers, pictures of graphs, images associated with a sound source, etc. In some embodiments, the three-dimensional sound space 300 can include a three-dimensional view of the sound sources 304A-F and any other relevant information. The three-dimensional sound space 300 can provide the three-dimensional view through any display device. The three-dimensional sound space 300 can provide the three-dimensional view of the sound sources 304A-F to allow the user to view a graphical representation of the three-dimensional sound space 300 and/or one or more of the sound sources 304A-F, while also listening to spatialized, three-dimensional audio. Moreover, the visual component of the three-dimensional sound space 300 can depict various facets, such as size, distance, location, identity, relationships, characteristics, direction, etc. In addition, the visual component can provide configuration options for the user, and/or a mechanism for changing aspects of the three-dimensional sound space 300. For example, the visual component can provide a mechanism for the user to change aspects of the playback, such as distort, equalizer settings, sound effects, etc.

The user 302 can move throughout the three-dimensional sound space 300 to bring different sound sources into focus. For example, the user 302 can move towards the skateboards source 304B to bring that source into focus. This way, the user 302 will be able to better listen to the skateboards source 304B. As the user 302 moves away from other sound sources, those sound sources can dim or fade as if the sound was coming from a farther distance. For example, as the user 302 moves towards the skateboards source 304B, the conferences source 304F and the agents source 304E can dim or fade. The user 302 can thus listen to all the sound sources 304A-F and browse the sound sources 304A-F by moving around in the three-dimensional sound space 300. The user 302 can move towards a source of interest by moving in the direction of the sound from the source.

For example, the user 302 can hear music coming from the sound source 304C in the three-dimensional sound space 300. If the user 302 is interested in listening to music, she can move in the direction of the music to move closer to the sound source 304C of the music. The user 302 can physically move in the direction of the music to move closer to the sound source 304C, or the user 302 can navigate to the sound source 304C using an input device, such as a joystick, a mouse, a keyboard, a touchscreen, a touchpad, a button, a remote, etc. The user 302 can also navigate the three-dimensional sound space 300 by making gestures and/or navigating a graphical representation of the three-dimensional sound space 300. For example, the user 302 can navigate to the sound source 304C by making a gesture indicating that the user 302 wants to navigate to the sound source 304C, and/or selecting a representation of the sound source 304C on a graphical user interface. Moreover, the navigation of the three-dimensional sound space 300 can be recorded, shared, and/or edited. For example, the navigation of the three-dimensional sound space 300 can be used to produce a playlist. Here, the content of the playlist can be based on the various sound sources that the user 302 navigates to, for example. The user 302 can then share the playlist and/or a recording of the navigation.

As the user 302 gets closer to the sound source 304C of the music, the music comes into focus. The user 302 can continue moving towards the sound source 304C until the music is in focus and/or at a level desired by the user 302. The user 302 can continue hearing audio from the other sound sources 304A-B and 304D-F. The sound level of the other sources can depend on the proximity of the sound sources relative to the user 302. Thus, the user 302 can hear a sound source louder and/or more clearly as the user 302 gets closer to the sound source. When the user 302 navigates to the sound source 304C, the three-dimensional sound space 300 can bring the sound source 304C into focus, but can also provide additional information about the sound source 304C and/or other sound sources related to the sound source 304C.

The three-dimensional sound space 300 can provide a faceted search with automated layouts. The automated layouts can be based on, for example, relationships between search hits, search terms, topics, attributes, filters, etc. The automated layout can provide grouping of sound sources for the user 302. Grouping of sound sources can be used to address large search spaces, for example. The user 302 can drill down search results to obtain additional information about the selected search results, which can be delivered to the user 302 through audio (e.g., text-to-speech) as if the user 302 is at the same location as the audio. The additional information can also be delivered as an entity in the three-dimensional sound space 300, such as a virtual agent. For example, the additional information can be delivered through a virtual agent that the user 302 perceives from the user's 302 right ear, for example. Further, the additional information, or a portion of the additional information, can be delivered through a display.

When the user 302 selects a sound source item, the three-dimensional sound space 300 can also bring-up a new search for the user 302. For example, when the user 302 selects a sound source representing an album, the three-dimensional sound space 300 can expand to bring-up a collection of songs associated with the album, which the user 302 can listen to, navigate, browse, search, copy, edit, share, etc. As another example, when the user 302 selects a sound source representing a song, the three-dimensional sound space 300 can expand to bring-up all of the songs by the same author.

While FIG. 3 is discussed with reference to one user, the same and/or similar concepts can apply to a group of users. For example, the three-dimensional sound space 300 can be searched, browsed, and/or navigated by a group of users. Here, the three-dimensional sound space 300 can consider an aggregate of the users' facets to determine relevance to the user for positioning sound sources. Moreover, the navigation of a group of users can be recorded, shared, edited, and/or combined into a playlist, for example.

Figure 4A:
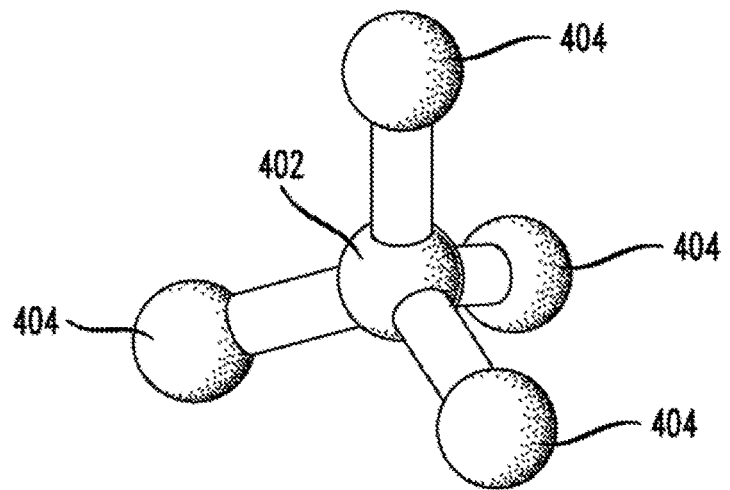
FIGS. 4A and 4B illustrate an example three-dimensional particle system.
Figure 4B:
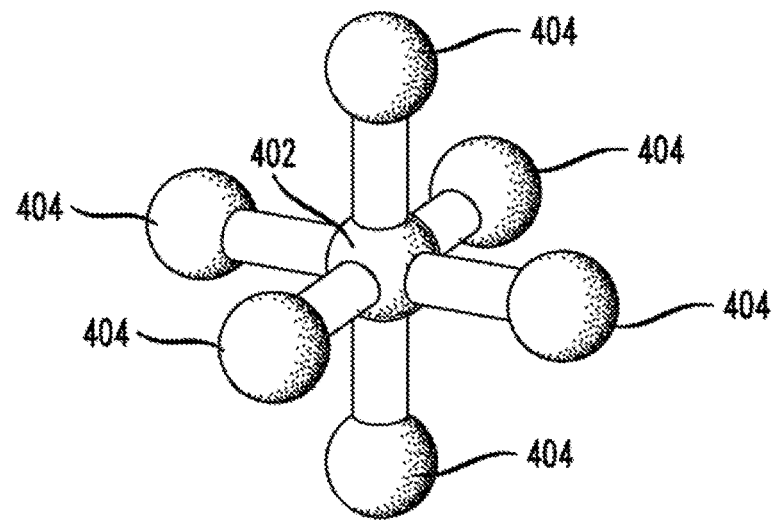

FIGS. 4A and 4B illustrate a particle system in three dimensions. Particle systems allow for easy programming of multiple factors simultaneously influencing audio effects in a sound space. Particle systems can be used to perform sound spatialization by mapping the various spatial trajectories of individual particles in the particle system to the spatial movement of individual, granular sounds. The particle system can be used to spatialize sound sources from other applications, recordings, and/or live inputs in real-time, for example. Spatialization can be used to clarify dense textures of sounds, choreograph complex audio trajectories, perceive greater number of simultaneous sound elements, etc.

A particle can be represented by a sound element, which, when combined with other similar particles, can create more natural and realistic sounds. Moreover, particles can themselves be particle systems. Each particle can have attributes and dynamics that can be assigned procedurally. The animation of a particle system can then be achieved by computing the behavior of each sound element.

In FIGS. 4A and 4B, lower weighted particles 404 surround a higher weighted particle 402. FIG. 4A only has 4 lower weighted particles 404, whereas FIG. 4B has 6 lower weighted particles 404. While the numbers of particles in a system can be quite large, these are shown only as basic examples of three-dimensional particle systems.

Figure 5:
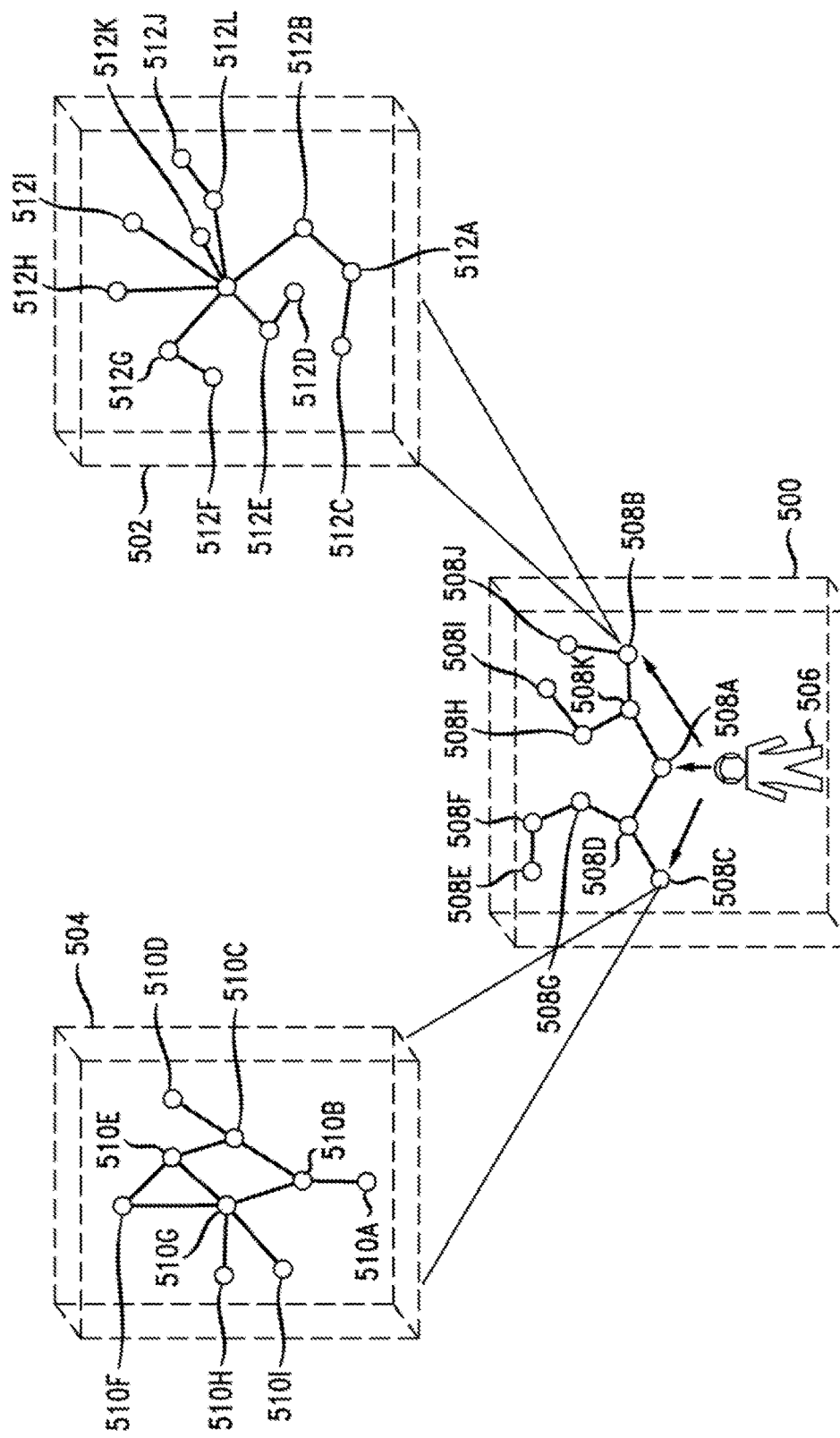
FIG. 5 illustrates an example three-dimensional particle system for arranging sound sources in a three-dimensional sound space.

FIG. 5 illustrates an example three-dimensional particle system for arranging sound sources in a three-dimensional sound space. The three-dimensional particle system can include particles 508A-K for spatializing sounds in a three-dimensional sound space 500. Each particle in the three-dimensional particle system can represent a sound source. With audio spatialization, the user 506 can perceive simultaneous sound elements from the sound sources represented by the particles 508A-K. The three-dimensional particle system maps the sound trajectories to provide the user 506 a realistic three-dimensional, virtual sound environment. The user 506 can perceive the virtual sound environment via any output device, such as a mobile device, an augmented reality device, a gaming system, a smart television, computerized glasses, three-dimensional glasses, a tablet computer, a smartphone, etc. The user 506 can browse through the sound sources by moving throughout the three-dimensional sound space 500. For example, the user 506 can bring a sound into focus by moving closer to the corresponding sound source. Similarly, the user 506 can dim a sound by moving away from the corresponding sound source.

A particle can itself be a particle system. For example, in FIG. 5, particles 508B and 508C are themselves particle systems. In particular, particle 508B is a three-dimensional particle system, which includes particles 512A-M. Particle 508C is also a three-dimensional particle system, which includes particles 510A-I. Thus, if user 506 moves toward a sound source represented by particle 508B, it can bring into focus the three-dimensional sound space 502, modeled by particles 510A-I. The user 506 then becomes immersed in the three-dimensional sound space 502, which allows the user 506 to perceive sound from the sound sources represented by particles 512A-M.

In some embodiments, particles 512A-M can be related to each other. Moreover, particles 512A-M can be related to particle 508B. For example, if particle 508B represents a sound source of lectures, the particles 512A-M in the three-dimensional particle system can represent different lectures. This way, the user 506 can navigate to a sound source and experience related sounds as the sound source expands to include additional, related sound sources. The related sound sources can self-arrange in a three-dimensional sound space 502 when the user 506 navigates to the sound source represented by particle 508B. The experience to the user 506 can be similar to selecting a category of sound sources and navigating the selected sound sources. The user 506 can also search sound sources and navigate the returned sound sources through a three-dimensional sound space.

Furthermore, if the user 506 moves toward the sound source represented by particle 508C, it can bring into focus the three-dimensional sound space 504, modeled by particles 510A-I. The user 506 then becomes immersed in the three-dimensional sound space 504, which allows the user 506 to perceive sound from the sound sources represented by particles 510A-I.

Figure 6:
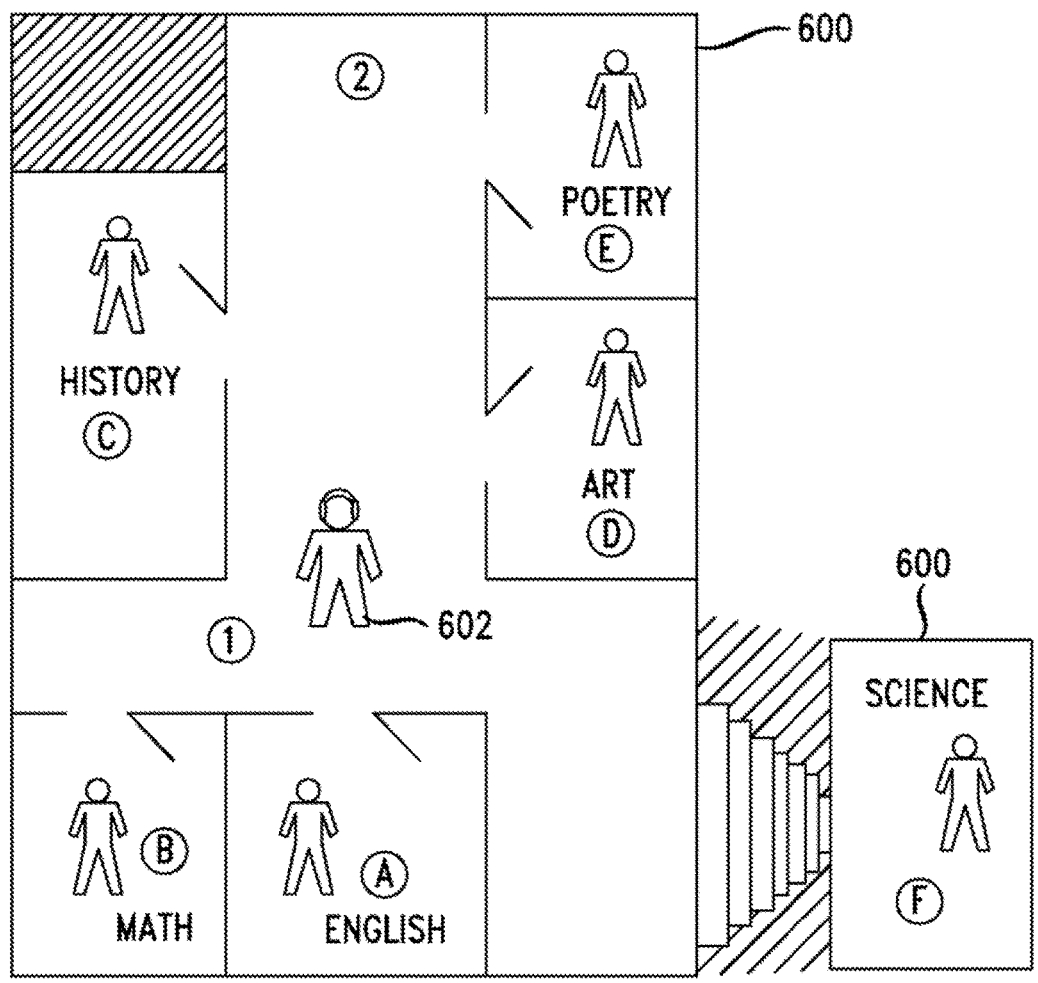
FIG. 6 illustrates an example user experience in a three-dimensional sound space with multiple sound sources.

FIG. 6 illustrates an example user experience in a three-dimensional sound space with multiple sound sources. Here, the user's experience navigating a three-dimensional sound space is illustrated by reference to what the user 602 perceives when navigating a college building 600. The college building 600 includes classrooms A-F. The classrooms A-F represent sound sources in a three-dimensional sound space, as each classroom generates sound in different dimensions, stemming from the professor's class lecture. Here, the user 602 is able to listen to the sound from the classrooms A-F at the same time. However, the sound perceived by the user 602 from the different classrooms will differ based on the proximity and/or location of the user 602 relative to the different classrooms. For example, when the user 602 is at position 1, she can perceive the lectures from classrooms A-D to be closer and/or more prominent, and the lectures from classrooms E and F farther and/or dimmer. Thus, the user 602 will be able to listen to the English, Math, History, and Art lectures from classrooms A-D, and at the same time will hear dimmer or faded poetry and science lectures from classrooms E and F.

Further, the user 602 can go inside a classroom to bring the lecture from that classroom into focus. For example, the user 602 can enter the classroom C to bring the history lecture into focus. This will cause the other lectures to fade out and/or dim. If the user 602 moves to position 2, she will affect the sound she perceives by changing her location relative to the different sound sources. For example, at position 2, the user 602 will be closer to the classroom E and farther away from the classrooms A and B than she was at position 1. Thus, by moving to position 2, the user 602 will bring the lecture from classroom E into focus, and will cause the lectures from classrooms A and B to fade out and/or dim. If interested in the poetry lecture, the user 602 can then enter the classroom E to listen to the poetry lecture. On the other hand, if the user 602 moves to position 3, she will bring the lecture from classroom F into focus and cause the other lectures to fade out and/or dim.

In this way, the user 602 can navigate the college building 600 to identify the different lectures and bring lectures into focus as desired. The user 602 moves around the college building 600 listening to all the lectures in the classrooms A-F, to identify a lecture of interest. Once the user 602 identifies a lecture of interest, she can bring that lecture into focus by moving closer to the corresponding classroom. If the user 602 then decides she wants to listen to that lecture, she can do so by entering the corresponding classroom.

The user 602 can also search for classrooms in the college building 600 and navigate the classrooms identified in the search. For example, the user 602 can look at a building directory to search for classrooms in the college building 600. The building directory can identify the location of the classrooms in the college building 600. The user 602 can then move to the location of those classrooms according to the building directory. This way, the user 602 can quickly find specific classrooms and go directly to those classrooms. From there, the user 602 can listen to the lectures in those classrooms and move/navigate through the building/classrooms to further narrow which lectures the user 602 wants hear.

Figure 7:
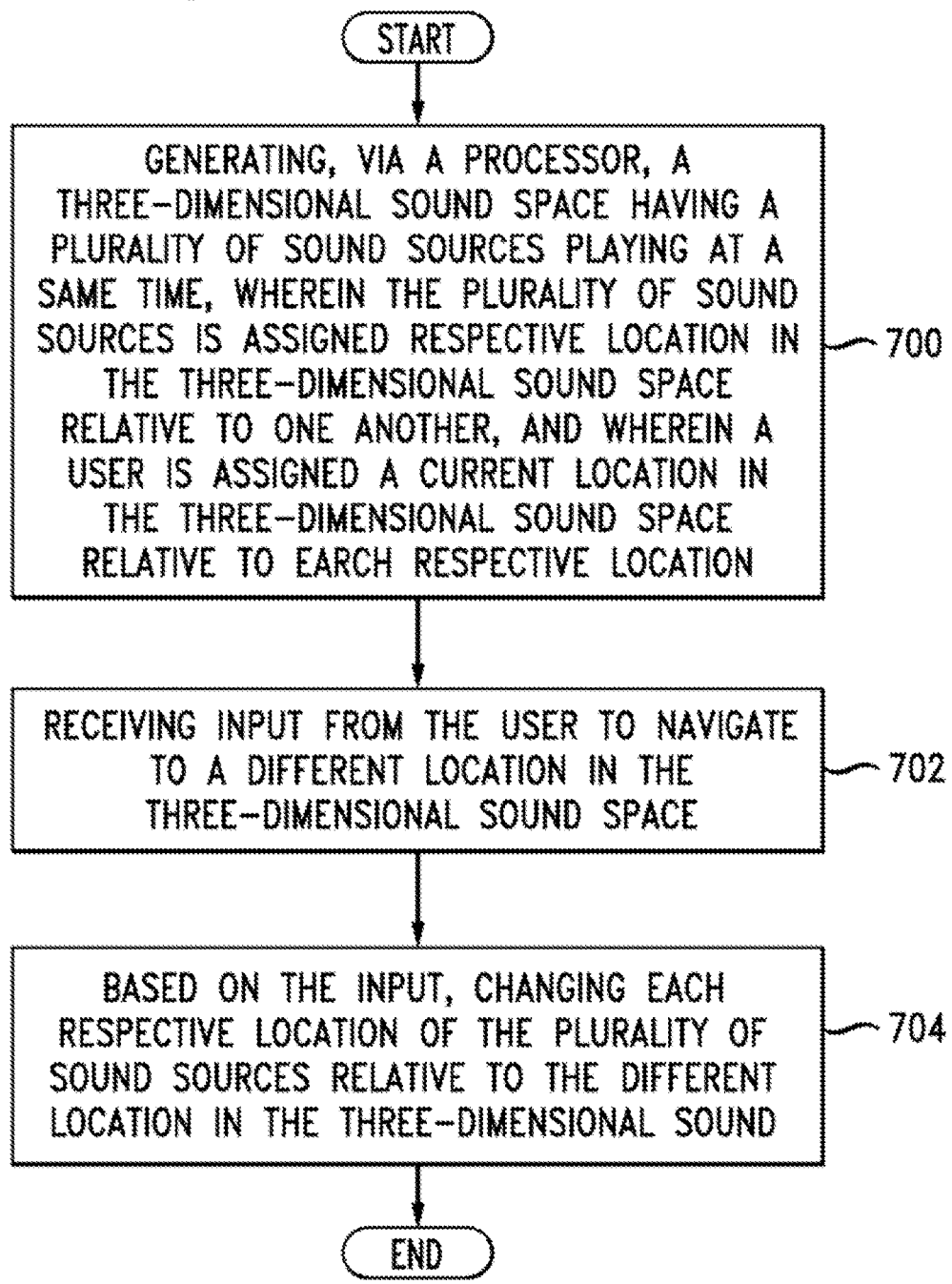
FIG. 7 illustrates an example method embodiment.

Having disclosed some basic system components and concepts, the disclosure now turns to the example method embodiment shown in FIG. 7. For the sake of clarity, the method is described in terms of example system 100, as shown in FIG. 1, configured to practice the method. The steps outlined herein are illustrative and can be implemented in any combination thereof, including combinations that exclude, add, or modify certain steps.

The system 100 generates a three-dimensional sound space having a plurality of sound sources playing at a same time, wherein each of the plurality of sound sources is assigned a respective location in the three-dimensional sound space relative to one another, and wherein a user is assigned a current location in the three-dimensional sound space relative to each respective location (700). The plurality of sound sources can include an audio file, a live communication session, a recorded conversation, etc. The three-dimensional sound space can be based on a three-dimensional particle system. Moreover, the three-dimensional sound space can be generated using three-dimensional audio spatialization to allow audio from multiple sound sources playing at a same time to be separated in space through sound localization. Spatialization can be used to clarify dense textures of sounds, choreograph complex audio trajectories, perceive greater number of simultaneous sound elements, etc. Thus, the three-dimensional audio spatialization can create what is widely known as the cocktail party effect from the plurality sound sources, allowing the user to listen to multiple sound sources at once, and, at the same time, recognize each sound source.

A three-dimensional particle system can be used to perform sound spatialization by mapping the various spatial trajectories of individual particles in the particle system to the spatial movement of individual, granular sounds. The three-dimensional particle system can be used to spatialize sound sources from other applications, recordings, sound sources, etc. The three-dimensional particle system can also be used to spatialize sound sources from live inputs in real-time, for example. A particle can be represented by a sound element (e.g., a sound source), which, when combined with other particles, can create more natural and realistic sounds. Also, particles can themselves be particle systems. Moreover, each particle can have attributes and dynamics that can be assigned procedurally, for example. The animation of a particle system can then be achieved by computing the behavior of each sound element.

In some embodiments, the three-dimensional sound space can create an immersive three-dimensional sound space through which users can navigate and issue search commands to better review search hits and find what they are looking for. Here, each of the plurality of sound sources is assigned a location in the three-dimensional sound space. Similarly, the user is also assigned a location in the three-dimensional sound space, and can control her position and navigate through the three-dimensional sound space. Audio spatialization can be used to create the cocktail party effect, which enables the user to listen to several conversations at once, and at the same time make each conversation out. Approaching a particular conversation object in the three-dimensional sound space can bring the conversation object into focus. Moreover, moving away from a conversation object can dim its audio just as walking away from a speaker in the real world would.

Each respective location in the three-dimensional sound space can be assigned to a respective sound source from the plurality of sound sources based on a relationship between the plurality of sound sources. For example, the plurality of sound sources can be assigned locations based on their differences, their similarities, their relative relevance to the user, their ranking, their age, their date, their topic(s), their rating, their level of detail and/or granularity, etc. The plurality of sound sources can also be assigned locations based on other factors, such as a user input, a history, a context, a preference, a rule, a setting, etc. Moreover, the plurality of sound sources can be arranged based on groupings. The groupings can be based on a topic, a relevance, a search request, a category, a level of detail, a ranking, a rating, a term, a title, a length, a creator, an identity, an age, an association, specific content, and/or other factors. Further, the plurality of sound sources can dynamically self-arrange based on an event and/or a trigger, such as a user input, a movement, a user gesture, a search request, a schedule, a calculation, a similarity, a threshold, an update, a selection, etc.

In some embodiments, the system 100 can first receive a search request from the user to search for sound sources, and identify the sound sources based on search criteria in the search request. The system 100 can then generate the three-dimensional sound space based on the sound sources identified in response to the search request. For example, the user can request the system 100 to search for lectures in a database of sound sources based on the search term "lectures." The system 100 can then search sound sources stored at the system 100 and/or a remote location for the term "lectures." The system 100 can also search any metadata associated with the sound sources for the term "lectures." The system 100 can then identify the sound sources matching the term "lectures," and generate the three-dimensional sound space based on the identified sound sources. This way, the system 100 can tailor the three-dimensional sound space based on the criteria supplied by the user. The system 100 can also arrange, order, and/or organize the sound spaces in the three-dimensional sound space according to a setting, a preference, a rule, a similarity, a relevance, a criteria, a ranking, a rating, an age, a user input, a history, a context, a topic, a level of detail and/or granularity, etc.

Next, the system 100 receives input from the user to navigate to a new location in the three-dimensional sound space (702). The system 100 can receive the input via a mouse, a touch screen, a touchpad, a keyboard, a camera, a photo-capture device, a voice-input device, a motion capture device, a system state, a device state, a sensor, an external event, a joystick, a software control, a remote, a navigation device and/or control, a button, etc. The input can be text, audio, a gesture, a movement, a selection, a click, an event, a signal from an input device, a command, a request, a query, an instruction, a motion, an input from a software control, etc. For example, the user can use an input device, such as a joystick, to navigate to the new location in the three-dimensional sound space. As another example, the user can navigate to the new location by physically moving in the direction of the new location, as perceived by the user in the three-dimensional sound space. Thus, the user can perceive the general direction of the new location relative to the user within the virtual sound space, and physically move in that direction to change the virtual location of the user in the three-dimensional sound space, with respect to the new location in the three-dimensional sound space.

In some embodiment, the user can navigate to the new location in the three-dimensional sound space by selecting a graphical representation of the new location in a graphical display. In other embodiments, the user can navigate to the new location in the three-dimensional sound space by pressing one or more buttons on a clickable control pad to instruct the system 100 to change the virtual location of the user relative to the plurality of sound sources and/or the new location. Here, the user can listen to the sounds from the plurality of sound sources, and use the clickable control pad to instruct the system 100 to move the virtual location of the user towards a sound source of interest to the user, as perceived by the user in the three-dimensional sound space.

Based on the input, the system 100 then changes each respective location of the plurality of sound sources relative to the new location in the three-dimensional sound space (704). The system 100 can dynamically arrange the plurality of sound sources based on the new location to simulate the user's movement through the three-dimensional sound space. For the user, this dynamic arrangement of sound sources can create the perception that the user has navigated the three-dimensional sound space and moved to the new location within the three-dimensional sound space. As the user navigates the three-dimensional sound space, the plurality of sound sources can dynamically self-arrange based on groupings, categories, rules, rankings, ratings, similarities, user input, context, metadata, size, sound quality, source type, etc. For example, the plurality of sound sources can dynamically self-arrange according to groupings based on a topic, a relevance, a search request, an association, a term, content, etc. The new location can be any virtual location within the three-dimensional sound space. Moreover, the new location can be a different three-dimensional sound space. Thus, by navigating to the new location, the user can navigate from one three-dimensional sound space to another three-dimensional sound space.

In some embodiments, the system 100 can receive a user selection of a sound source from the three-dimensional sound space and generates a new three-dimensional sound space based on sound sources related to the selected sound source. Here, the sound sources can be assigned locations relative to one another, and the user can be assigned a location relative to the sound sources and associated with the sound source. For example, the user can select a sound source from the three-dimensional sound space, and the system 100 can then generate a new three-dimensional sound space having other sound sources that are relevant to the sound source selected by the user. The sound sources in the new three-dimensional sound space can be arranged or grouped based on one or more factors, such as similarities, differences, age, topics, rankings, ratings, etc. The user can select the sound source from the three-dimensional sound space by moving toward the sound source in the three-dimensional sound space, clicking on a graphical representation of the sound source in an interface, navigating towards the sound source using a navigation device or button, gesturing to select the sound source, gesturing to indicate a motion towards the sound source, etc.

In other embodiments, the system 100 can use a three-dimensional particle system to dynamically layout and order the various audio recordings that are playing and audible in the three-dimensional sound space. The respective positions of the audio recordings can be based on their relationship to one or more search objects that the user has selected. The three-dimensional particle system can be rendered by the system 100 and displayed by the system 100 and/or any display device, such as a monitor, a tablet computer, three-dimensional glasses, a hologram projection, a smartphone, and a gaming system. Also, the distance between the user and the plurality of sound sources can be based on an apparent three-dimensional position of the user.

The three-dimensional sound space can act like a faceted search system. However, in some aspects, the objects in the three-dimensional sound space are not removed from the three-dimensional sound space as search terms are introduced. Instead, the objects move towards the terms that they are associated with, and those objects with no associations can fall to the ground. This self-arrangement can represent relationships between the content objects and the search objects, and allow the user to listen to similarities (if there are any) of the objects that are grouped together. For example, the user can easily detect a consistent tone in all the calls in the three-dimensional sound space that relate to complaints and a particular customer care agent. This arrangement also allows the user to browse through the sounds in the three-dimensional sound space that relate to the different customer care agents, for example, and listen to their calls to get a sense of the content of their calls.

In one example, the user can select the search object "Bob" in the system 100. In response, all the conversations that relate to Bob can attach themselves to the object representing Bob in the three-dimensional sound space. The user can then select "customer complaints," which causes an object representing the tag "customer complaint" to be introduced into the three-dimensional sound space. The conversations that have been tagged "customer complaint" can then self-arrange around the "customer complaint" tag object. Those conversations that are tagged "customer complaint" and also involve Bob can attach to both the Bob object and the "customer complaint" tag object, and group together. The user can continue to refine the search, and at the same time browse the groups to listen to the conversations in the groups. Moving close to a conversation, or dragging a conversation towards the user, for example, can result in the conversation being perceived as being closer to the user and/or louder to the user than other conversations. Moreover, the user can opt to blank out the other conversations and just listen to the specific conversation.

Embodiments of the disclosure can be used with a wide variety of different content and in a variety of different applications. That is, the three-dimensional sound space as described herein can be generated based on sound sources of different origins and types and for a number of different uses. Additionally or alternatively, the sound sources may be or relate to content other than audio content. For example, a sound source may comprise documents, emails, social media posts, text messages, instant messages, or any of a wide variety of textual information converted by a text-to-speech engine to an audio format. In such cases, the three-dimensional sound space can be generated and the sound sources therein including the converted textual content source can be grouped as described. Additionally or alternatively, the generation of the three-dimensional sound space and/or groupings of the sound sources therein can be based on attributes of the sources such as defined by one or more metadata tags associated with the sound sources. Such attributes can be the basis of identifying similarities, differences, relationships, etc. between sound sources and can therefore be the basis of grouping those sound sources together and arranging or locating them in the sound space. In some cases, these attributes may be converted to audio and added to the sound space in addition to or instead of the actual content of the source to either augment or simplify the sound space and assist the user in navigating through the space.

According to one embodiment, the three-dimensional sound space can comprise a combined three-dimensional audio/visual space. That is, both audio and non-audio data can be represented as sound sources in a three-dimensional sound space adapted to also provide visual data. The non-audio data can comprise video, images, text, documents, and/or any other data typically presented in a visual form. Such non-audio data can be associate with audio sound sources presented in the sound space. In some cases, the non-audio data can be associated with a sound source representing audio data to which the non-audio data relates, e.g., the sound track of a video and the visual portion of the video can be associated and represented in the combined three-dimensional audio/visual space. In other cases, a sound source associated with the non-audio data can be generated from the non-audio data, e.g., by converting the text of a document to speech or by converting attributes of the non-audio data to one or more sound sources associated with the non-audio data.

Navigation within this combined three-dimensional audio/visual space can be based primarily on the audio aspects of the sound sources with the details of the non-audio data being presented on demand, for example, when the listener navigates through the combined three-dimensional audio/visual space to a particular sound source at which point the non-audio data associated with that sound source can be presented, e.g., on a monitor or wearable display that can be combined with or separate from audio equipment used to present the sound sources. This combined three-dimensional audio/visual space can provide a convenient and efficient way to review large volumes of data that include a mix of audio and visual elements such as may be found on social media networks or any of a variety of Internet or other network sites. According to one embodiment, the combined three-dimensional audio/visual space can be used to provide a video conferencing environment. Additionally or alternatively, the combined three-dimensional audio/visual space can be used to provide a virtual classroom or other collaboration environment.

Figure 8:
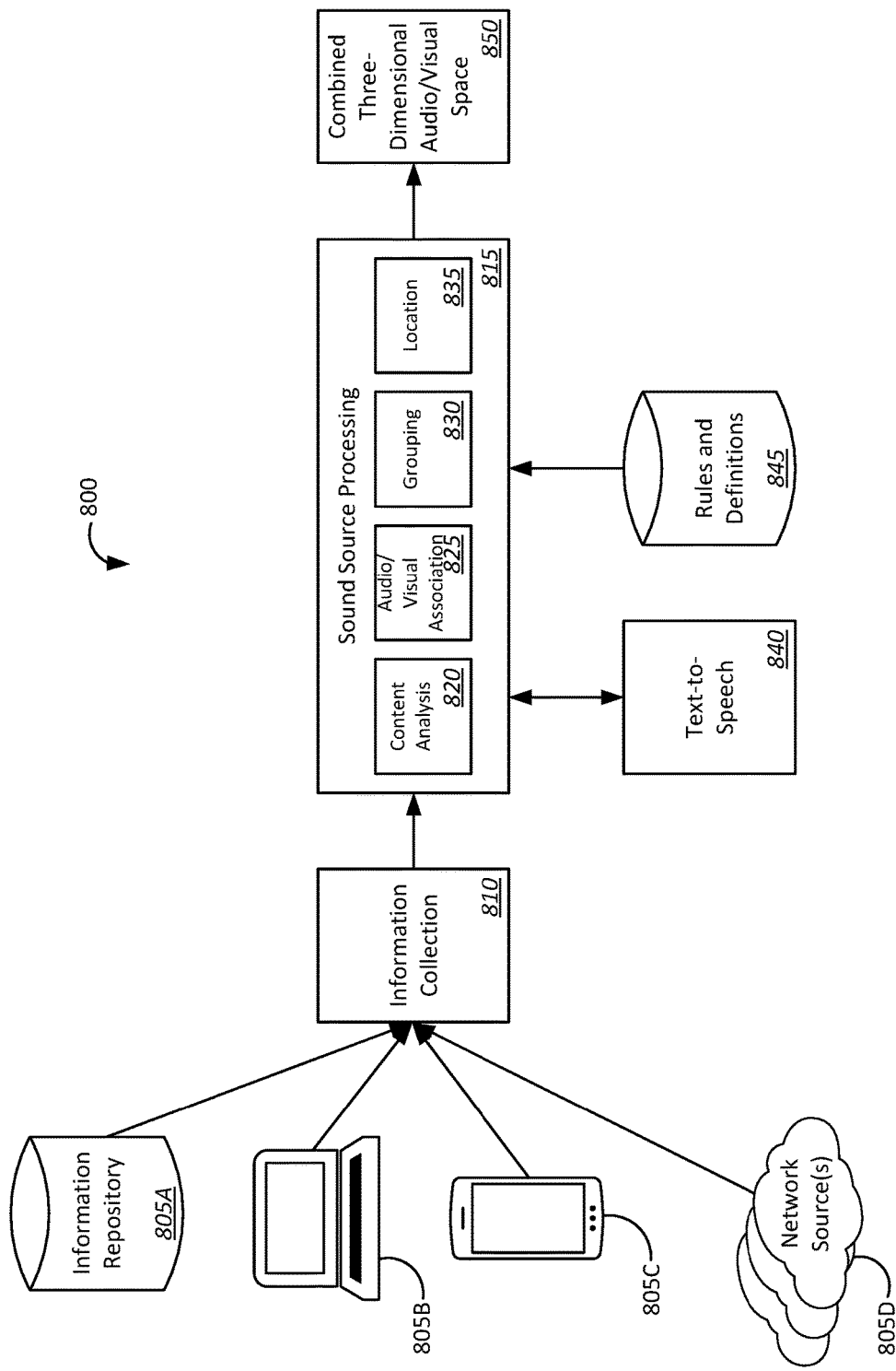
FIG. 8 is a block diagram of an exemplary system using a combined three-dimensional audio/visual space according to one embodiment.

FIG. 8 is a block diagram of an exemplary system using a combined three-dimensional audio/visual space according to one embodiment. As illustrated in this example, the system 800 can include any number of information sources 805A-805D of different types. These sources 805A-805D can include sources of stored information such as one or more information repositories 805A storing previously recorded and saved audio and/or non-audio files. Additionally or alternatively, the information sources can include sources of both stored and live or real-time information such as any number of remote computer systems 805B, mobile devices 805C or other computing devices. These sources 805A-805D can include one or more network sources 805D. The one or more network sources 805D can comprise any private or public network such as the Internet and can further comprise any number of social media networks including but not limited to Facebook, LinkedIn, Twitter, Foursquare, Instagram, Pinterest, and others.

The system 800 can also comprise an information collection system 810 which can comprise a server or other computer system communicatively coupled with the information sources 805A-805D via one or more communication networks (not shown here). The information collection system 810 can collect information from one or more data sources 805A-805D, for example by crawling, searching, or otherwise accessing sites on the networks 805D according to a set of hyperlinks, rules, definitions, a query string, or other information identifying those sites of interest. In some cases, the information collection system 810 can initiate and/or support a video conference or other interactive, collaborative communication session between any number of computers 805B and/or mobile devices 805C and conducted in the combined three-dimensional audio/visual space. In other cases, the information collection system may execute queries on one or more repositories 805A to retrieve stored information to be presented in the combined three-dimensional audio/visual space 850. In still other cases, some or all of the data sources 805A-805D may be accessed by other elements of the system 800 without use of or involvement by the information collection system 810. Regardless of how or where the data is collected from, the collected information can comprise both audio data and non-audio data such as documents, emails, social media posts, text messages, instant messages, etc.

The system 800 can also comprise a sound source processing system 815 such as a server or other computing system. It should be noted that while the information collection system 810 and the sound source processing system 815 are illustrated separately here for the sake of discussion, they may, depending upon the exact implementation, be implemented together in the same physical and/or virtual machine. Generally speaking, the information collected by the information collection system 810 can be processed into a plurality of sound sources by the sound source processing system 815 based on one or more attributes of the information and possibly a set of rules and definitions 845 for controlling or influencing the processing. In some cases, if the collected information comprises non-audio data, processing the collected information into a plurality of sound sources can comprise converting the non-audio data to audio data by a text-to-speech conversion system 840 as known in the art and which may be implemented separate from or as part of the same physical and/or virtual machine as the sound source processing system 815 and/or information collection system 810. In some cases, the non-audio data can comprise metadata or other information defining attributes of the collected information which, in some implementations, additionally or alternatively be converted to audio data by the text-to-speech conversion system 840.

More specifically, processing the collected information into a plurality of sound sources can comprise analyzing the collected information, for example by content analysis module 820 to identify tags related to the information. In some cases, tags may already be applied to the information and can be read and used. In other cases, the information can be further analyzed by the content analysis module 820 using various types of analysis techniques known in the art to identify factors such as an origin of the information, content of the audio, speakers involved in a conversation, voice stress levels, sentiment of the speakers, tone of the speakers, etc. and tags or attributes can be applied to the information by the content analysis module 820 based on that analysis.

According to one embodiment, an audio/visual association module 825 of the sound source processing system 815 can then make associations between the non-audio data and the sound sources. For example, an image or file may be associated with a particular sound source representing audio data related to that image or file. In some cases, that association may be made to a particular portion of a sound source such as a particular time during playback of audio content of the sound source when the image or file should be presented or made available for viewing in the combined three-dimensional audio/visual space 850. As noted above, sound sources may be generated in some cases, e.g., from metadata or other information describing or characterizing the non-audio data, an association can be made between the non-audio data and the generated sound source, and the generated sound source can be presented in the combined three-dimensional audio/visual space 850 as a representation of the non-audio data for navigation purposes.

A grouping module 830 of the sound source processing module 815 can group the sound sources based on the one or more attributes of the collected information. That is, sound sources can be identified by the grouping module 830, in some cases using the rules and definitions 845 identifying similarities and/or conditions upon which groupings can be made, as related, similar, or relevant to one another based on related or common attributes. Such related, similar, or mutually relevant sound sources can be assigned by the grouping module 830 to groups which can later be presented in the combined three-dimensional audio/visual space 850 together. In some cases, these groups may be represented in the combined three-dimensional audio/visual space 850 by the attribute or attributes, converted to audio as needed, upon which the grouping is made. Therefore, the listener need not be inundated with all of the audio available for any given group but can be presented with a representative sound source until such time as the user navigates closer to that sound source. It should be noted and understood that a particular group may comprise one sound source or any number of sound sources.

According to one embodiment a location module 835 of the sound source processing system 815 can assign the grouped sound sources to the respective location in the combined three-dimensional audio/visual space 850 relative to one another based on the one or more attributes of the collected information. In other cases, the location within the combined three-dimensional audio/visual space 850 may be assigned by the combined three-dimensional audio/visual space 850 as described above. In either case, the groups of sound sources can be arranged and/or positioned at particular three-dimensional locations within the combined three-dimensional audio/visual space 850 as described above. The initial positioning or assignment of the sound sources to a particular location may, in some cases, be based on a relevance or importance of a sound source or group of sound sources which may be determined on any one or more of the attributes. Such location determinations may also be based at least in part on one or more rules and/or definitions 845.

The processed sound sources can then be presented by the combined three-dimensional audio/visual space 850 providing a sound space having the plurality of sound sources playing at a same time. As described above, each of the grouped plurality of sound sources can be assigned a respective location in the combined three-dimensional audio/visual space 850 relative to one another, and the user or listener can be assigned a current location in the combined three-dimensional audio/visual space 850 relative to each respective location. The user can then navigate through the combined three-dimensional audio/visual space 850 toward any particular sound source or group of sound sources of interest. In some cases and as noted, the sounds presented may be the attributes of the sound source or sound source group, converted to audio as needed and used as a representation of the sound source or sound source group. In this way, the user can listen to representative sounds without being overwhelmed by the actual content of what may be a large volume sound sources or sound source groups. Then, as the user navigates the sound space to bring particular sound sources or sound source groups into focus, the sound space may be presented based on the user's new location within the space. The new location, being closer to a particular sound source or sound source group can provide addition details of those sound source which may, depending upon proximity, make available the actual audio content of some or all of the sound sources as well as the non-audio data associated with those sound sources.

Navigation within this combined three-dimensional audio/visual space 850 can be based primarily on the audio aspects of the sound sources with the details of the non-audio data being presented on demand or as appropriate, for example, when the listener navigates through the combined three-dimensional audio/visual space 850 to a particular sound source at which point the non-audio data associated with that sound source can be presented. This combined three-dimensional audio/visual space 850 can provide a convenient and efficient way to review large volumes of data that include a mix of audio and visual elements such as may be found on social media networks or any of a variety of Internet or other network sites. According to one embodiment, the combined three-dimensional audio/visual space 850 can be used to provide a video conferencing environment. Additionally or alternatively, the combined three-dimensional audio/visual space can be used to provide a virtual classroom or other collaboration environment.

Embodiments described herein are thought to be particularly useful with and can be applied to social media content. Such content, which can include both audio and non-audio data, can be collected from one or more social media networks by the information collection system 810 and processed into sound sources by the sound source processing system 815, including conversions by text-to-speech conversion system 840 as needed. As noted above, the metadata or other data representing the attributes of the collected information can also be processed by the sound source processing system 815 into sound sources and used to represent individual sound sources or groups of sound sources in a simplified manner. Collected non-audio data can similarly be processed and associated with sound sources or used to generate sound sources that are associated with that non-audio content by the audio/visual association module 825. For example, images in a post can be associated with a sound source representing that post. Additionally or alternatively, one or more sound sources can be generated and associated with the images by converting metadata or other information related to the images, e.g., a name of the image etc., or by adding a pre-defined sound source used to represent images in the combined three-dimensional audio/visual space 850.

The collected information can be grouped by the grouping module 830 and located within the combined three-dimensional audio/visual space 850 by the location module 835 based on attributes indicating a relationship, e.g., a degree of affiliation, between the original poster or author of the content and the listener. For example, content from family or "friends" or other users of the social media who are known to and closely affiliated with the listener, can be grouped together into one or more groups and placed in a particular locations of the sound space while content from unknown users of the social media or users with a relatively low degree of affiliation with the listener can be grouped together into one or more groups and placed in a different location of the sound space. Other attributes can additionally or alternatively be used to group the sound sources.

As described above, once presented in the combined three-dimensional audio/visual space 850, the user or listener can navigate through the sound sources audibly and choose sound sources by virtually moving towards the ones of interest. In some embodiments, the voices of the posters or representations of the voices of the posters could be used to read, via speed synthesis, the representative audio and/or content audio of the sound source groups or individual sound sources so that the listener not only hears substantively what is said but can tell who provided the postings.

For example, a user of the combined three-dimensional audio/visual space 850 can review a set of social media postings represented as sound sources in the combined three-dimensional audio/visual space 850. Rather than just scroll down through the postings as typically done when viewed visually on a monitor, the user can hear the posts or sound source representations of the posts as they are presented in the combined three-dimensional audio/visual space 850. The user could then navigate in the combined three-dimensional audio/visual space 850 toward a particular sound source of interest. Once the user navigates to or near that sound source, associated non-audio data can be presented, e.g., on a monitor or wearable display, so that they can, for example, see the text of the post and can read it, play an embedded video, view related images, read and comments, etc.

According to one embodiment, the combined three-dimensional audio/visual space 850 can be used to participate in a video conference. In this context, each individual on a video conference can use an individual combined three-dimensional audio/visual space 850. In the combined three-dimensional audio/visual space 850 the audio from the conference can be presented in a particular location while the video is presented on a monitor or wearable display. When the individual navigates to the location of the video conference in the combined three-dimensional audio/visual space 850, e.g., to join the conference, the audio of the conference is the loudest and clearest audio. During the conference, some additional information may become available to one or the participants. For example, the participant may receive a new email, voicemail, social media communication, etc. That communication can be processed by the sound source processing system 815 as described above and presented as a sound source in the combined three-dimensional audio/visual space 850 that the participant can hear as well. Then, while on the video conference, that participant can navigate to this other sound source temporarily in order to listen to the converted email, voicemail, etc. while the conference audio is lowered but still audible and understandable. Other functionality like returning a call and putting the conference audio on mute can also be accomplished via spoken or a combination of inputs.

According to one embodiment, documents or other non-audio data, perhaps related to and associated with the video conference can be processed into sound sources by the sound source processing system 815 and presented in the combined three-dimensional audio/visual space 850 in a particular location. The user can be aware of the presence and availability of these documents by hearing the sound source associated with them, e.g., the spoken name of the document, description, etc. When the user navigates to the document, the content of the document can then be presented on their monitor, wearable display, etc. while the audio of the conference is still audible. Additionally or alternatively, a conference participant can initiate a search and receive results in the combined three-dimensional audio/visual space 850 as described above while the video conference is being conducted and the audio of the conference is still audible to the participant as a sound source within the combined three-dimensional audio/visual space 850 as the participant navigates the search results.

Additionally or alternatively, audio from each of the conference participants can be located in the combined three-dimensional audio/visual space 850 as sound sources at different locations that each participant can navigate towards or away from. For example, board members may be on a conference as sound sources in the chairman's combined three-dimensional audio/visual space 850. The vice president may be located in a position in the combined three-dimensional audio/visual space 850 while accountants, lawyers, engineers, etc. can be located in other pre-defined positions in the combined three-dimensional audio/visual space 850 so that it is familiar. Then, if one of the participants wants to talk to the engineers, she can move in that direction and know that this is the location of the engineering representative(s) in the conference.

According to one embodiment, the combined three-dimensional audio/visual space 850 can be used to provide a virtual classroom or a collaboration environment. For example, audio from a teacher in the virtual classroom can be presented as a sound source with audio from participating students also represented as sound sources in the combined three-dimensional audio/visual space 850. Each of these sound sources can be assigned a location, e.g., based on some predefined arrangement or virtual "seating chart." The teacher may be presented as the central or loudest and clearest audio but as people ask questions or make comments, those sound sources can be heard as well in the combined three-dimensional audio/visual space 850 of each participant.

As in the video conference implementation, other non-audio data such as class materials, reference documents, assignments, etc. can be processed by the sound source processing system 815 and presented as or associated with sound sources in the combined three-dimensional audio/visual space 850 as described above. These materials can then be accessed by participants by navigating through the combined three-dimensional audio/visual space 850. For example, when a student moves toward the location of a sound source representing background information, the teacher could be attenuated, muted, and/or paused while the student investigates the information in the combined three-dimensional audio/visual space 850, i.e., audibly and visually as described above.

According to further embodiments, the video conference and virtual classroom models can be applied to other environments and uses. For example, the video conference and virtual classroom implementations can be applied to situations like press conferences and other group settings. Some group settings can, in many cases, benefit from a collaboration environment implemented using the combined three-dimensional audio/visual space 850 as described herein. For example, in the context of medical treatment or group consults, a combined three-dimensional audio/visual space 850 can be used to present information to individuals that are consulting to multiple people (e.g., group surgeries, group consults, etc.). In this and other cases it may be useful to execute further processing such that a limited number of sound sources are presented in the combined three-dimensional audio/visual space 850 at a given time. As an example, the sound source processing system 815 and/or combined three-dimensional audio/visual space 850 could limit the number of sound sources presented at any given time to some predefined number representing a useful threshold that enables the processing of a large amount of data by listeners in the combined three-dimensional audio/visual space 850 but also ensure that the listener can navigate the combined three-dimensional audio/visual space 850 in a useful way. In other words, the combined three-dimensional audio/visual space 850 can be adapted to make sure that a listener is not overwhelmed with too many sound sources at a time.

Figure 9:
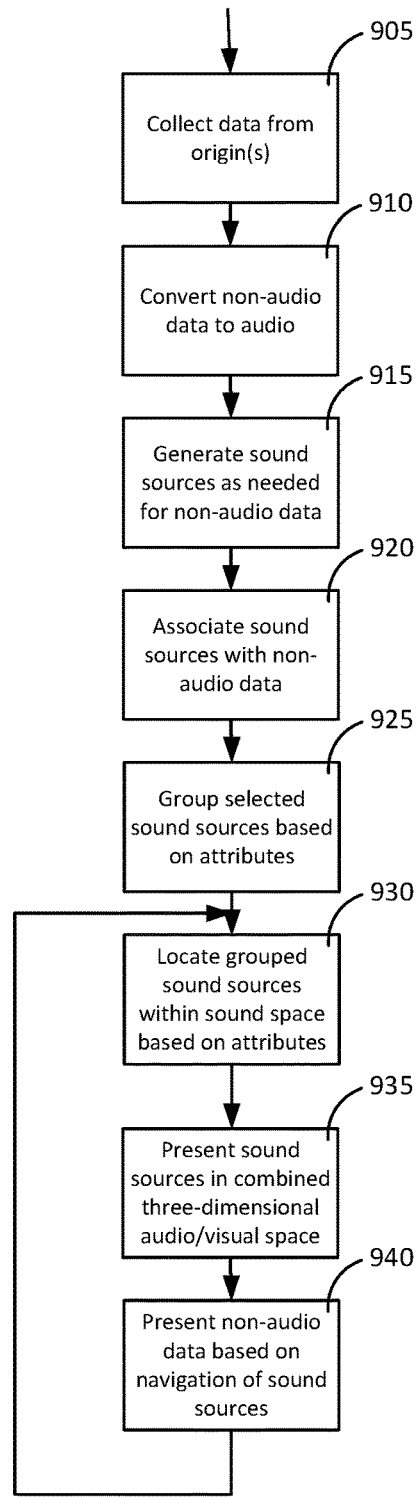
FIG. 9 is a flowchart illustrating an exemplary process for using a combined three-dimensional audio/visual space according to one embodiment of the present invention.

FIG. 9 is a flowchart illustrating an exemplary process for using a combined three-dimensional audio/visual space according to one embodiment of the present invention. As illustrated in this example, using a combined three-dimensional audio/visual space can begin with collecting 905 information from one or more data sources. The collected information comprising at least in part non-audio data from at least one of the one or more data sources. For example, the non-audio data can comprise video, still pictures, text files and/or other documents, social media posts and/or other messages, etc.

The collected information can be processing 910-930 into a plurality of sound sources based on one or more attributes of the collected information. More specifically, processing the collected information into a plurality of sound sources can comprise converting 910 at least some of the non-audio data to audio data. In some cases, the converted non-audio data can comprise the attributes of the collected non-audio data. In some cases, a sound source may be generated 915 to represent the non-audio data, e.g., based on the attributes of the non-audio data. Processing the collected information into the plurality of sound sources can further comprise associating 920 the non-audio data with at least one sound source such as the generated sound source representing the non-audio data or another sound source such as an audio track from a video, a text-to-speech conversion of a content of a social media post or message or a document. In some cases, attributes of the sound sources can be used to influence or change the acoustic properties of the sound delivered. This enables items to be clustered together and still be acoustically distinguishable. For example, any one or more of pitch, amplitude, frequency, speed, loudness, echo, bass, treble, or any other acoustic property can be used as a basis of transforming or adjusting the audio of a sound source. In some cases, attributes can be converted into acoustic properties for rendering in the three-dimensional sound space. For example, any one or more of sentiment, dialog turns, keywords, phrases, location, time of day, etc. can be attributes which can then be turned into acoustic properties like above.

The sound sources can then be grouped 925 based on the one or more attributes of the collected information. That is, sound sources can be identified as related, similar, or relevant to one another based on related or common attributes. Such related, similar, or mutually relevant sound sources can be assigned to groups which can be presented in the combined three-dimensional audio/visual space together. In some cases, these groups may be represented in the combined three-dimensional audio/visual space by the attribute or attributes, converted to audio as needed, upon which the grouping is made. Therefore, the listener need not be inundated with all of the audio available for any given group but can be presented with a representative sound source until such time as the user navigates closer to that sound source. It should be noted and understood that a particular group may comprise one sound source or any number of sound sources.

Processing the collected information into a plurality of sound sources can further comprise assigning 930 the grouped sound sources to the respective location in the combined three-dimensional audio/visual space relative to one another based on the one or more attributes of the collected information. In other words, the groups of sound sources can be arranged and/or positioned at particular three-dimensional locations within the combined three-dimensional audio/visual space as described above. The initial positioning or assignment of the sound sources to a particular location may, in some cases, be based on a relevance or importance of a sound source or group of sound sources which may be determined on any one or more of the attributes.

The processed sound sources can then be presented 935 in the combined three-dimensional audio/visual space having the plurality of sound sources playing at a same time. As described above, each of the plurality of sound sources can be assigned a respective location in the three-dimensional sound space relative to one another and the user can be assigned a current location in the three-dimensional sound space relative to each respective location. Presenting 935 the plurality of sound sources in the combined three-dimensional audio/visual space can comprise presenting the converted attributes for the sound source or a group of sound sources. The user can then navigate through the three-dimensional sound space toward any particular sound source or group of sound sources of interest.

At least one graphical presentation of the non-audio data presenting 940 in the combined three-dimensional audio/visual space based on navigation within the combined three-dimensional audio/visual space by the user. That is, and as described above, presenting 935 the plurality of sound sources in the three-dimensional sound space can further comprise receiving an input from the user to navigate to a new location in the three-dimensional sound space and changing each respective location of the plurality of sound sources relative to the new location in the three-dimensional sound space based on the input. Presenting 940 the at least one graphical representation of the non-audio data in the combined three-dimensional audio/visual space is further based on changing each respective location of the plurality of sound sources relative to the new location in the combined three-dimensional audio/visual space. Presenting 935 the plurality of sound sources in the combined three-dimensional audio/visual space can further comprise receiving an input from the user to navigate to a new location in the combined three-dimensional audio/visual space and changing each respective location 930 of the plurality of sound sources relative to the new location in the combined three-dimensional audio/visual space based on the input and re-presenting 935 the audio/visual space based on this navigation until the user exits the audio/visual space or otherwise restarts or exits the process.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
collecting, by a processor, information from one or more data sources, the collected information comprising at least in part non-audio data from at least one of the one or more data sources;
processing, by the processor, the collected information into a plurality of sound sources based on one or more attributes of the collected information;
presenting, by the processor, the plurality of sound sources in a combined three-dimensional audio/visual space comprising the plurality of sound sources playing at a same time in a three-dimensional sound space of the combined audio/visual space, wherein each of the plurality of sound sources is assigned a respective location in the three-dimensional sound space relative to one another, and wherein a user is assigned a current location in the three-dimensional sound space relative to each respective location; and
presenting, by the processor, at least one graphical presentation of the non-audio data in the combined three-dimensional audio/visual space based on navigation within the combined three-dimensional audio/visual space by the user.

2. The method of claim 1, wherein processing the collected information into a plurality of sound sources further comprises converting at least some of the non-audio data to audio data.

3. The method of claim 2, wherein processing the collected information into a plurality of sound sources further comprises grouping the selected sound sources based on the one or more attributes of the collected information and assigning the grouped sound sources to the respective location in the combined three-dimensional audio/visual space relative to one another based on the one or more attributes of the collected information.

4. The method of claim 2, wherein the converted non-audio data comprises the attributes of the collected non-audio data.

5. The method of claim 4, wherein presenting the plurality of sound sources in the combined three-dimensional audio/visual space comprises presenting the converted attributes for the sound source or a group of sound sources.

6. The method of claim 2, wherein processing the collected information into the plurality of sound sources comprises associating the non-audio data with at least one sound source.

7. The method of claim 6, wherein associating the non-audio data with at least one sound source further comprises generating the at least one sound source representing the non-audio data.

8. The method of claim 1, wherein presenting the plurality of sound sources in the combined three-dimensional audio/visual space further comprises:
receiving an input from the user to navigate to a new location in the combined three-dimensional audio/visual space; and
based on the input, changing each respective location of the plurality of sound sources relative to the new location in the combined three-dimensional audio/visual space.

9. The method of claim 8, wherein presenting the at least one graphical representation of the non-audio data in the combined three-dimensional audio/visual space is further based on changing each respective location of the plurality of sound sources relative to the new location in the combined three-dimensional audio/visual space.

10. The method of claim 1, wherein the combined three-dimensional audio/visual space comprises one of a video conferencing environment, a social media environment, a virtual classroom environment, or a collaboration environment.

11. A system comprising:
a processor; and
a memory coupled with the processor and storing a set of instructions which, when executed by the processor, causes the processor to provide a combined three-dimensional audio/visual space by:
collecting information from one or more data sources, the collected information comprising at least in part non-audio data from at least one of the one or more data sources;
processing the collected information into a plurality of sound sources based on one or more attributes of the collected information;
presenting the plurality of sound sources in the combined three-dimensional audio/visual space comprising the plurality of sound sources playing at a same time in a three-dimensional sound space of the combined audio/visual space, wherein each of the plurality of sound sources is assigned a respective location in the three-dimensional sound space relative to one another, and wherein a user is assigned a current location in the three-dimensional sound space relative to each respective location; and
presenting at least one graphical presentation of the non-audio data in the combined three-dimensional audio/visual space based on navigation within the combined three-dimensional audio/visual space by the user.

12. The system of claim 11, wherein processing the collected information into a plurality of sound sources further comprises:
converting at least some of the non-audio data to audio data;
grouping the selected sound sources based on the one or more attributes of the collected information; and
assigning the grouped sound sources to the respective location in the combined three-dimensional audio/visual space relative to one another based on the one or more attributes of the collected information.

13. The system of claim 12, wherein the converted non-audio data comprises the attributes of the collected non-audio data and wherein presenting the plurality of sound sources in the combined three-dimensional audio/visual space comprises presenting the converted attributes for the sound source or a group of sound sources.

14. The system of claim 12, wherein processing the collected information into the plurality of sound sources comprises associating the non-audio data with at least one sound source.

15. The system of claim 14, wherein associating the non-audio data with at least one sound source further comprises generating the at least one sound source representing the non-audio data.

16. The system of claim 11, wherein presenting the plurality of sound sources in the combined three-dimensional audio/visual space further comprises:
receiving an input from the user to navigate to a new location in the combined three-dimensional audio/visual space; and
based on the input, changing each respective location of the plurality of sound sources relative to the new location in the combined three-dimensional audio/visual space, wherein presenting the at least one graphical representation of the non-audio data in the combined three-dimensional audio/visual space is further based on changing each respective location of the plurality of sound sources relative to the new location in the combined three-dimensional audio/visual space.

17. A non-transitory computer-readable medium comprising a set of instructions stored therein which, when executed by a processor, causes the processor to:
   collect information from one or more data sources, the collected information comprising at least in part non-audio data from at least one of the one or more data sources;
   process the collected information into a plurality of sound sources based on one or more attributes of the collected information;
   present the plurality of sound sources in the combined three-dimensional audio/visual space comprising the plurality of sound sources playing at a same time in a three-dimensional sound space of the combined audio/visual space, wherein each of the plurality of sound sources is assigned a respective location in the three-dimensional sound space relative to one another, and wherein a user is assigned a current location in the three-dimensional sound space relative to each respective location; and
   present at least one graphical presentation of the non-audio data in the combined three-dimensional audio/visual space based on navigation within the combined three-dimensional audio/visual space by the user.

18. The non-transitory computer-readable medium of claim 17, wherein processing the collected information into a plurality of sound sources further comprises:
   converting at least some of the non-audio data to audio data;
   grouping the selected sound sources based on the one or more attributes of the collected information; and
   assigning the grouped sound sources to the respective location in the combined three-dimensional audio/visual space relative to one another based on the one or more attributes of the collected information.

19. The non-transitory computer-readable medium of claim 18, wherein the converted non-audio data comprises the attributes of the collected non-audio data and wherein presenting the plurality of sound sources in the combined three-dimensional audio/visual space comprises presenting the converted attributes for the sound source or a group of sound sources.

20. The non-transitory computer-readable medium of claim 17,
   wherein presenting the plurality of sound sources in the combined three-dimensional audio/visual space further comprises:
   receiving an input from the user to navigate to a new location in the combined three-dimensional audio/visual space; and
   based on the input, changing each respective location of the plurality of sound sources relative to the new location in the combined three-dimensional audio/visual space, wherein presenting the at least one graphical representation of the non-audio data in the combined three-dimensional audio/visual space is further based on changing each respective location of the plurality of sound sources relative to the new location in the combined three-dimensional audio/visual space.

* * * * *